INVENTOR
Homer H. Grant
BY
Smith & Tuck
ATTORNEYS

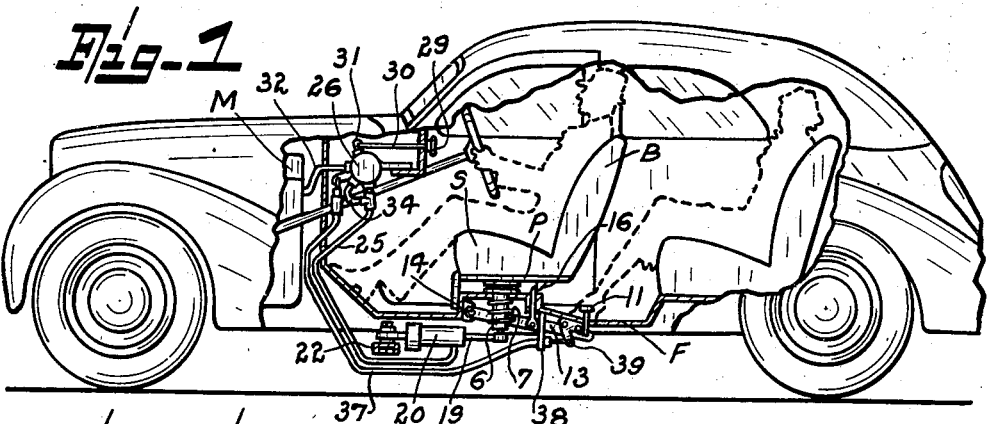

Patented May 20, 1941

2,242,247

UNITED STATES PATENT OFFICE 2,242,247

ROTATABLE VEHICLE SEAT

Homer H. Grant, Olympia, Wash.

Application April 21, 1939, Serial No. 269,261

2 Claims. (Cl. 155—5).

My present invention relates to an improved rotatable vehicle seat of the type used in two-door sedans, and other types of automobiles where the front seat is horizontally shifted in order to make room for ingress to and egress from the rear seat of the car. The front seat is pivoted and provided with an actuating spring near one end, while the other end of the seat is supported on anti-friction-rollers, and means are provided for horizontally swinging or revolving the front seat on its pivot whereby the right end of the front seat is moved forward of the right hand doorway so that ample space may be provided for ingress and egress of the passengers sitting in the rear seat of the car.

Means are also provided for latching the front seat in its normal or closed position with relation to the right-hand front doorway, and pedal-operating releasing or unlatching means are provided for use of the rear-seat passenger for opening the horizontally shiftable seat with relation to the right-hand doorway of the car.

Control means, readily accessible to the driver or occupant of the front seat, and manually controlled, are provided for unlatching the seat from its normal position; and vacuum means or fluid pressure-operated means connected with the intake manifold or other part of the internal combustion engine which propels the car, are also available for use in returning the seat to normal transverse position.

The invention consists in certain novel combinations and arrangements of parts, as will hereinafter be more fully set forth and claimed. In the accompanying drawings I have illustrated one complete example of the physical embodiment of my invention wherein the parts are combined and arranged according to one mode I have thus far devised for the practical application of the principles of my invention.

Figure 1 is a view in side elevation of a conventional two-door sedan, with parts broken away to illustrate the installation of the appliance of my invention, and showing a manually controlled fluid pressure-operated mechanism under control of the driver of the car for returning the seat to normal position, together with pedal operated unlatching means for the seat accessible to a passenger in the rear seat of the car.

Figure 2 is an enlarged view of parts in Figure 1 and shown as a section of the car.

Figure 3 is a view showing the floor of the car in section, and illustrating by dotted lines the range of horizontally swinging movement of the right-hand end of the seat to open position.

Figure 4 is a enlarged detail plan view showing the cylinder, piston stem, and lever of the fluid pressure-operated means for returning the seat to normal position.

Figure 5:
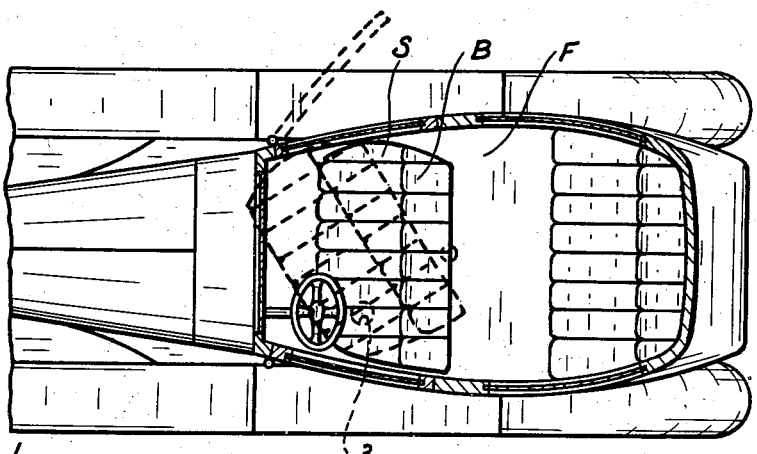
Figure 5 is a conventional, sectional, horizontal view of the car, showing by dotted lines the seat with its right-hand end swung to open position with relation to the right front doorway.

In order that the general relation and utility of parts of the appliance may readily be observed I have illustrated a conventional two-door sedan with usual parts as the floor F, the front seat S with its back B, and a bottom seat-plate or frame P, and the motor or internal combustion engine for propelling the car is indicated at M.

As best seen in Figure 3, the right end of the seat, which swings forwardly and to the rear, is supported on a seat-roller 1 which rolls on the floor F, and several floor-rollers 2 over which the right end of the seat glides in its swinging movement. The seat swings horizontally on the upright pivot pin or swivel pin 3 located near the left end of the seat, and the pin has an attaching flange 4 at its upper end by means of which the pin is bolted to the frame or bottom of the seat.

Below the flange 4 a spaced flange 5 rests upon and is secured to the floor F, and suitable anti-friction bearings are provided between the flanges to facilitate swinging of the seat. The bearing flange 4, as shown is integral with the pivot pin 3, and the bearing flange 5 is integral with a sleeve 6 that projects below the floor and encloses the pivot pin 3.

Coiled around the sleeve 6 is a stout tension spring 7 which is designed to swing the seat on its pivot pin, in a horizontal plane, and for this purpose one end of the spring is anchored to the floor at 8, and the other end 9 of the spring engages against a lever arm 10 that is rigidly mounted on the pivot pin. By this arrangement of parts the spring tends to swing the front seat so that the right end of the seat swings forwardly to increase the available space in the doorway at the right front of the car. To prevent accidental swinging of the seat a latch device is employed to retain the seat in its normal position.

This latch device may be released by an occupant of the rear seat, through the use of a pedal 11 at the floor of the rear compartment of the car, as best seen in Figure 1. The pedal extends down through the floor F and is pivoted at 12 to a latch bar 13 which is pivoted at 14 to the floor of the car. An upwardly extending latch 15 is pivoted to the latch bar and extends upwardly through a guide 17 in the floor for co-action with a downwardly extending spring actuated dog 16 that is mounted on the bottom of the seat in position to engage the latch when the seat is in normal or closed position. Thus by depressing the pedal, as in Figure 6, the latch is disengaged from the dog 16 in Figure 2, thus permitting the spring 7 to swing the seat from position of Figure 2 to that of Figure 6.

For automatically swinging or returning the seat to its normal position, against the tension of spring 7, I employ a differential fluid pressure operated device, or vacuum system, that is manually controlled by the driver or occupant of the front seat.

As best seen in Figure 4, the lever arm 10 rigidly mounted on and adapted to turn the pivot pin 3, at its free end is pivoted to a piston stem 19 that enters the vacuum cylinder 20, and a piston 21 is mounted on the inner end of the stem within the cylinder. The cylinder is supported at 22 on a frame-piece located below the floor of the car, and as shown best in Figure 2 and the end of the cylinder opposite to the piston end is provided with a vent hole 23, and a needle valve 24 mounted in the end of the cylinder is adapted to vary the volume of air passing to and from the atmosphere to the interior of the cylinder.

The vacuum cylinder is indirectly connected with the intake manifold, or other suitable part of the motor, by the use of a pipe line 25 which communicates with the cylinder at its working end, and the other end of the pipe line communicates with a control valve-casing 26, supported in convenient position in the front compartment of the car. An oscillatible or plug valve 27 is mounted to turn in the casing, and this valve as shown is provided with an angular port 28. The valve is manually controlled by the use of a knob or handle accessible to the driver of the car and indicated at 29, and the stem 30 of the knob is pivoted to an ear 31 rigid with the valve. The valve casing is also connected by a short vacuum pipe or suction pipe 32 with the intake manifold, or other suitable part of the motor M, as indicated. In Figure 2 it will be seen that the intake manifold and the vacuum cylinder 20 are normally in direct communication through vacuum pipe 32, the angular port 28 of the valve, and the pipe line 25, thus holding the pivot pin against turning movement.

Atmospheric pressure, entering through port or vent 23 at the left end of the cylinder, and imposed against the front or left face of the piston 21, also aids in holding the seat against turning, regardless of the latch device.

To swing the seat from closed or normal position of Figure 2 to the open position of Figure 5, the valve knob 29 is pulled out to position of Figure 5, thus turning the valve to disconnect it from the pipe-line and the vacuum pipe, and thus closing the valve from the motor. The valve thus turned opens one end of the angular port 28 to the atmosphere at port 33 of the casing, and the other end of the angular port 28 is connected with a by-pass pipe 34 that is connected with the main pipe line 25 between the valve and the vacuum cylinder. Under these conditions the valve is cut off from the motor, and the pipe line 25 and vacuum cylinder are open to the atmosphere, as indicated in Figure 5, so that atmospheric pressure entering the right hand end of the cylinder moves the piston to the left as in Figure 6, thus tending to swing the seat to the open position of Figure 6.

Simultaneously with the pull of the valve knob 29 to cut off the suction from the motor, the latch 15—16 is also disengaged by unlatching mechanism controlled by the position of the knob, and co-acting with the pedal-operated unlatching device previously described. For this purpose I utilize an ear 35 rigid with and oscillatible with the valve, to which is connected a wire 36 encased in a housing 37. The wire, which extends down to the operating mechanism, is supported on a bracket 38, and at its end the wire is connected to one arm 39 of a bell crank lever, which is pivoted at 40 beneath the floor F, and adjacent the depressible latch bar 13. The other end of the bell crank lever, as 41, is provided with a laterally extending pin 42 which projects over the upper edge of the latch bar 13.

Thus it will be seen that as the knob 29 is pulled out to control the valve, the wire is actuated to swing the bell-crank lever, and the pin 42 of the lever depresses the latch bar to disengage the latch 15 from the spring dog or pawl 16 mounted on the bottom plate of the seat.

Figure 6:
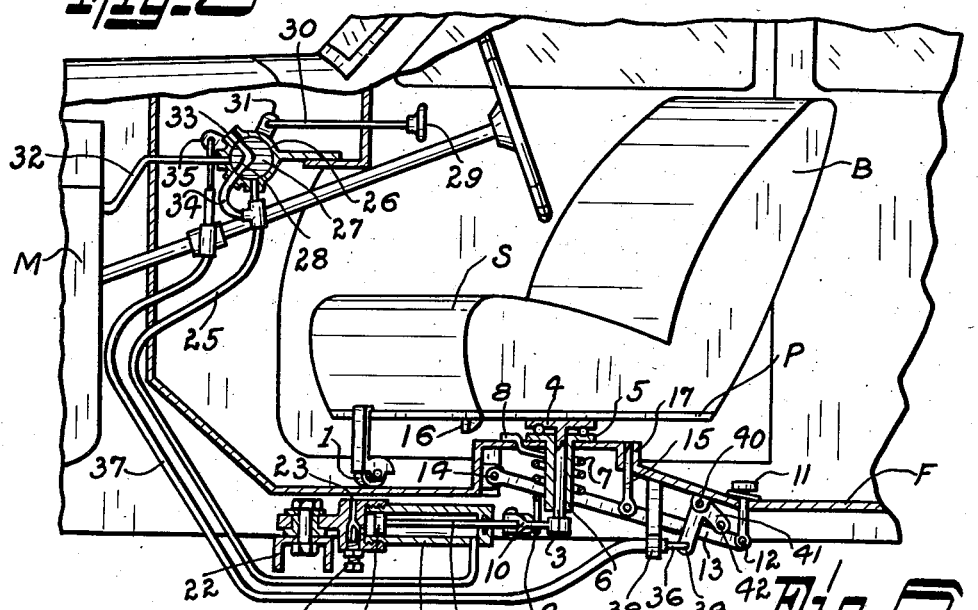
Figure 6 is a view in elevation showing the seat swung to forward or open position, and illustrating the fluid pressure-operated means for returning the seat to normal or closed position, together with the pedal control and the manual control for unlatching the seat when it is in normal position.
Figure 7:
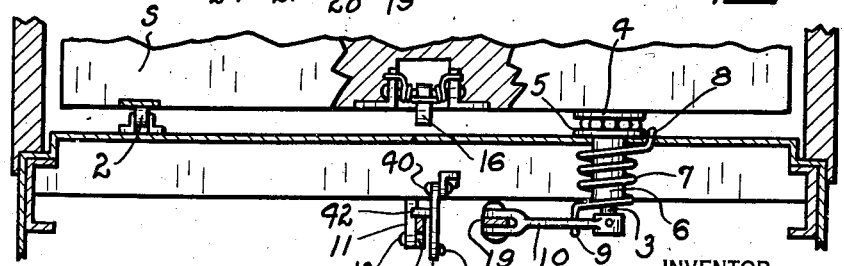
Figure 7 is a sectional view transversely of the car showing the spring and pivot at one end of the front seat, one of the anti-friction rollers at the other end of the seat, and also showing part of the latching mechanism of the seat.

Under these conditions the spring 7 and air pressure are employed to swing the seat to position of Figure 6.

To restore the seat to normal position, against the tension of spring 7, the knob 29 is pushed in from position of Figure 6 to that of Figure 2, thus turning the angular port 28 of the valve into communication with the vacuum pipe 32 and the pipe line 25, and suction from the motor through these parts moves the piston 21 to position of Figure 2, actuating the lever 10 to swing the pin 3 and the seat to normal position. The latch 15 is thus automatically engaged with the spring pawl 16, and the seat is held in normal position, or closed with relation to the front right-hand doorway.

The seat S can not be accidentally swung to an open position by an occupant of the rear seat, as vacuum pressure is applied to piston 21 the entire time the automobile engine is in motion. The vacuum cylinder used in returning the seat must be proportioned so that it is stronger and overcomes the action of the seat actuating spring 7.

When the motor is stopped seat may be returned to normal position, if desired, by pushing against the front floor boards with the feet or against the back of the front seat with the hand.

In order not to complicate the drawings, no illustration is made of means for adjusting the seat, as a whole, longitudinally of the car to compensate for different height of individual drivers. It will be apparent, it is believed that the seat as a whole may be adjusted by means now generally employed, in which the whole seat would be movable with respect to shaft 3. Cylinder 20 may be made of sufficient length and support rollers 1 so installed as to give the customary latitude of adjustment.

The foregoing description and the accompanying drawings are believed to clearly disclose a preferred embodiment of my invention, but it will be understood that this disclosure is merely illustrative and that such changes in the invention may be made as are fairly within the scope and spirit of the following claims:

1. The combination with a floor frame, a bearing sleeve supported therein, a rotative seat having a pivot pin mounted in the sleeve, an operating lever rigid with the pin, and a coiled spring anchored to the frame and said lever for swinging the seat from normal position, of a spring-tripped dog pivotally mounted on the seat, a latch bar pivotally mounted beneath the floor frame, a retaining latch pivotally mounted on the bar and projecting upward into engagement with the dog, and means whereby the latch-bar and latch are depressed to release the dog and thereby permit the seat to swing from normal position.

2. The combination with a bearing sleeve and its floor-frame support, a rotative seat having a pivot pin mounted in the sleeve, an operating lever rigid with the pin, and a coiled spring anchored to the frame and said lever for swinging the seat from normal position, of co-acting latch members mounted on the seat and floor frame for retaining the seat in normal position and means for disengaging said members, a fluid-pressure operated motor and linkage therefrom to said lever, a suction pipe, a pipe line connected to the motor, and a control valve between said pipe and line whereby the motor is actuated by differential fluid pressure for returning the seat to normal position.

HOMER H. GRANT.